(12) United States Patent
Hsu et al.

(10) Patent No.: US 11,395,529 B2
(45) Date of Patent: Jul. 26, 2022

(54) SLIDER FOR SLIDE FASTENER AND METHOD FOR MANUFACTURING SLIDER FOR SLIDE FASTENER

(71) Applicant: YKK CORPORATION, Tokyo (JP)

(72) Inventors: Hsien Hsiang Hsu, Taipei (TW); Chun Chun Lai, Taipei (TW); Shinya Honda, Taipei (TW)

(73) Assignee: YKK CORPORATION

( * ) Notice: Subject to any disclaimer, the term of this patent is extended or adjusted under 35 U.S.C. 154(b) by 78 days.

(21) Appl. No.: 16/986,823

(22) Filed: Aug. 6, 2020

(65) Prior Publication Data

US 2021/0037929 A1 Feb. 11, 2021

(30) Foreign Application Priority Data

Aug. 8, 2019 (CN) .......................... 201910733390.6

(51) Int. Cl.
*A44B 19/26* (2006.01)
*B29C 45/14* (2006.01)
*B29K 101/12* (2006.01)
*B29L 5/00* (2006.01)

(52) U.S. Cl.
CPC ...... *A44B 19/262* (2013.01); *B29C 45/14344* (2013.01); *B29C 45/14467* (2013.01); *B29K 2101/12* (2013.01); *B29K 2905/10* (2013.01); *B29K 2905/12* (2013.01); *B29L 2005/00* (2013.01)

(58) Field of Classification Search
CPC ....... A44B 19/262; A44B 19/26; A44B 19/42; B29C 45/14344; B29C 45/14467; B29C 45/1671; B29C 2045/1673; B29K 2101/12; B29K 2905/10; B29K 2905/12; B29L 2005/00
See application file for complete search history.

(56) References Cited

U.S. PATENT DOCUMENTS

| 8,931,145 | B1 * | 1/2015 | Liao | ..................... A44B 19/262 24/429 |
| 9,271,548 | B2 * | 3/2016 | Keyaki | ................ A44B 19/262 |
| D778,780 | S * | 2/2017 | Wang | .......................... D11/221 |

(Continued)

FOREIGN PATENT DOCUMENTS

| CN | 200976884 | 11/2007 |
| JP | 3044341 | 12/1997 |

(Continued)

*Primary Examiner* — Robert Sandy
*Assistant Examiner* — Louis A Mercado
(74) *Attorney, Agent, or Firm* — Taylor English Duma LLP

(57) ABSTRACT

A slider for slide fastener includes: a body including a pull tab attachment post; and a pull tab. The pull tab includes: a coupling member including an exposed portion and an embedded portion; and a pinching member including a first pinching portion including an annular end portion having an opening through which the embedded portion is to be inserted, and a second pinching portion provided to the first pinching portion with the embedded portion interposed therebetween. At least one of a front end surface and a rear end surface of the pull tab attachment post has a protrusion. And when the pull tab is tilted toward at least one of a front side and a rear side of the body, the protrusion locks the pull tab to restrict rotation of the pull tab.

15 Claims, 12 Drawing Sheets

(56) References Cited

U.S. PATENT DOCUMENTS

| | | | | |
|---|---|---|---|---|
| D778,781 S * | 2/2017 | Wang | ............................ | D11/221 |
| 9,936,774 B2 * | 4/2018 | Hsu | ...................... | A44B 19/262 |
| 10,413,023 B2 * | 9/2019 | Hsu | ........................ | A44B 19/26 |
| 10,905,204 B2 * | 2/2021 | Kondo | ................... | A44B 19/42 |
| 2004/0034974 A1 * | 2/2004 | Arai | ..................... | A44B 19/262 |
| | | | | 24/429 |
| 2015/0321399 A1 * | 11/2015 | Hong | ...................... | C08L 75/04 |
| | | | | 524/539 |

FOREIGN PATENT DOCUMENTS

| | | |
|---|---|---|
| JP | 3135346 | 9/2007 |
| JP | 5489181 | 5/2014 |
| JP | 5688584 | 3/2015 |

\* cited by examiner

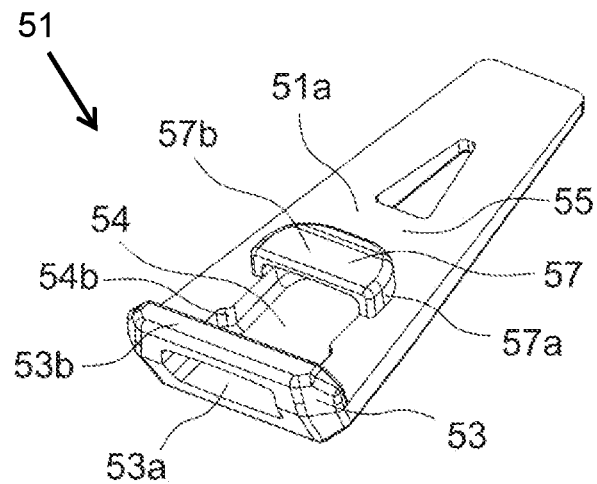
FIG. 5A
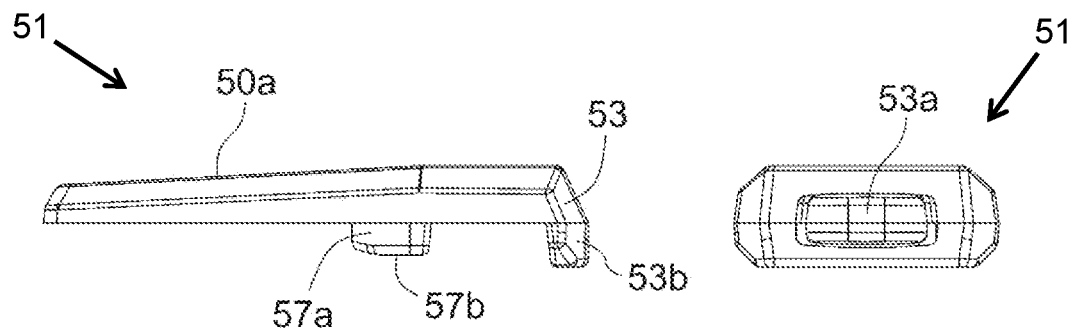
FIG. 5B
FIG. 5C
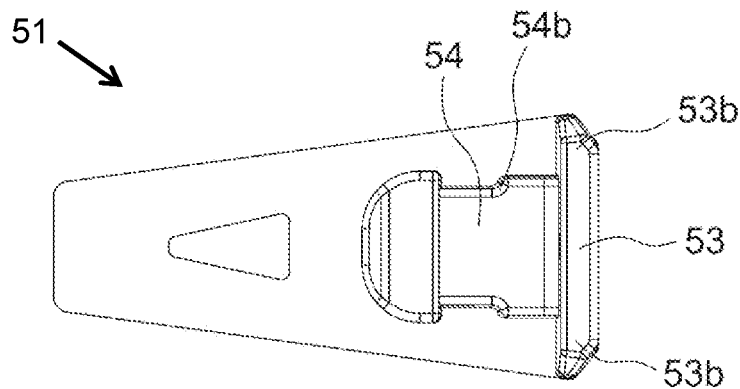
FIG. 5D

SLIDER FOR SLIDE FASTENER AND METHOD FOR MANUFACTURING SLIDER FOR SLIDE FASTENER

CROSS-REFERENCE TO RELATED APPLICATIONS

This application is based on Chinese Patent Application No. 201910733390.6 filed on Aug. 8, 2019, the contents of which are incorporated herein by way of reference.

BACKGROUND

The present invention relates to a slider for a slide fastener and a method for manufacturing a slider for a slide fastener.

Patent Literature 1 discloses a slider for a slide fastener, the slider including a body and a pull tab that are formed by integrated injection molding of a resin. In the slider of Patent Literature 1, protrusions are formed on a front end surface and a rear end surface in a front-rear direction of the pull tab attachment post. This enables a "pull tab fixing function" such that when the pull tab is tilted toward either side in the front-rear direction of the body, the protrusions lock the pull tab to restrict rotation of the pull tab.

Patent Literature 2 discloses a slider including a body, and a pull tab including a decorative member and a coupling body made of metal and attached to a pull tab attachment post of the body. The coupling body includes an exposed portion exposed from the pull tab and an embedded portion embedded in the pull tab. The exposed portion includes a ring-shaped coupling portion, and is attached to the pull tab attachment post of a cover member of the slider by the ring-shaped coupling portion. The pull tab of Patent Literature 2 is made by injection molding of a pull tab body with respect to the decorative member and the coupling body prepared in advance. The injection molding of the pull tab body is performed by arranging the embedded portion of the coupling body and the decorative member of the pull tab molded in advance in a cavity of a pair of molding dies with a gap therebetween and without contacting with each other, and injecting a molten resin into the cavity to form the pull tab body as a coating layer. As a result, the pull tab including the decorative member is formed.

Patent Literature 1: Japanese Patent No. 5489181
Patent Literature 2: Chinese Utility Model Registration No. 200976884

The slider for the slide fastener disclosed in Patent Literature 1 has the pull tab fixing function such that the rotation of the pull tab tilted to one of the front and rear directions of the body is restricted by the protrusions, and thus can prevent wobbling of the pull tab. However, when surface treatment such as painting is further performed to the slider having the integrally molded body and pull tab, since paint is stuck to portions of the protrusions that interfere with the pull tab, there may be a problem that when the pull tab is rotated beyond the protrusion, the painting applied to a surface of the pull tab attachment post of the slider is damaged.

On the other hand, in a case of Patent Literature 2, which does not have the "pull tab fixing function", the above problem does not exist. However, according to this pull tab, upon injection molding of the pull tab body, a surface of the exposed portion of the coupling body, particularly a surface of a portion adjacent to the embedded portion, is damaged due to mold clamping of the molding die, and painting, plating, or the like applied to the surface of the coupling body is damaged. In addition, burrs may be generated upon the injection molding, and productivity is lowered due to processing of the burrs. Moreover, the mold presses the coupling body and damages the coupling body. Further, due to absent of the "pull tab fixing function", when the slide fastener is not opened and closed, swing of the pull tab cannot be stopped.

SUMMARY

Accordingly, an object of the present invention is to provide a slider that can prevent damaging a painting of a pull tab attachment post due to a paint stuck to an interference portion between a protrusion and a pull tab, damaging a surface of a coupling body and generating burrs upon molding of a pull tab body, and that has a pull tab fixing function, and to provide a method for manufacturing the slider.

According to one advantageous aspect of the present invention, there is provided a slider for slide fastener includes: a body including an upper blade, a lower blade, a guide post that connects the upper blade and the lower blade, and a pull tab attachment post erected on an upper surface of the upper blade; and a pull tab coupled to the pull tab attachment post. The pull tab includes: a coupling member including an exposed portion having a shaft portion rotatably coupled to the pull tab attachment post, and an embedded portion; and a pinching member including a first pinching portion including an annular end portion having an opening through which the embedded portion is to be inserted, and a second pinching portion provided to the first pinching portion with the embedded portion interposed therebetween. At least one of a front end surface and a rear end surface of the pull tab attachment post has a protrusion. And when the pull tab is tilted toward at least one of a front side and a rear side of the body, the protrusion locks the pull tab to restrict rotation of the pull tab.

According to this configuration, when the body and the coupling member formed in another step are to be painted, since the pinching member of the pull tab, which can interfere with the protrusion of the pull tab attachment post, is formed separately in another step thereafter, the problem in the related art, that the painting applied to the portion of the protrusion of the pull tab attachment post that interferes with the pull tab of the slider having the "pull tab fixing function" capable of restricting the rotation of the pull tab is damaged, would not occur. Further, since the pinching member of the pull tab is separately formed and can be attached with a logo or a design, the problem in the related art, that the pull tab and the body are painted together and thus a film thickness of the painting in the portion of the logo or design formed by injection molding is uneven and the quality of the logo or the design is impaired, would not occur. Therefore, it is possible to provide a slider that has a pull tab fixing function and that can prevent damaging a painting of a pull tab attachment post due to a paint stuck to an interference portion between a protrusion and a pull tab, damaging a surface of a coupling body or a logo or design formed on the pull tab and generating burrs upon molding of a pull tab body.

According to other advantageous aspect of the present invention, the first pinching portion includes a first pinching portion body including a housing portion configured to house the embedded portion.

According to this configuration, since the first pinching portion can house the embedded portion of the coupling member, relative positions of the first pinching portion and the coupling member can be easily determined by a simple method, so that the coupling member can be appropriately positioned in the pinching portion.

According to other advantageous aspect of the present invention, the embedded portion includes a locking portion. The housing portion includes a locked portion. And the locking portion and the locked portion are used for determining relative positions of the first pinching portion and the coupling member.

According to this configuration, relative positions of the first pinching portion and the coupling member can be determined more correctly by a simple method, so that the coupling member can be appropriately positioned in the pinching portion.

According to other advantageous aspect of the present invention, the housing portion includes a covering portion formed to cover a portion of the embedded portion when the embedded portion is housed in the housing portion.

According to this configuration, displacement between the first pinching portion and the embedded portion upon molding of the second pinching portion can be prevented by the covering portion.

According to other advantageous aspect of the present invention, the annular end portion is formed with a contact portion protruding toward the pull tab attachment post on at least one of left and right sides on an end surface facing the pull tab attachment post. And the contact portion is formed to contact with the protrusion while the pull tab is tilted toward at least one of the front side and the rear side of the body.

According to this configuration, it is possible to provide the slider with the pull tab fixing function with a simple configuration.

According to other advantageous aspect of the present invention, the embedded portion has a hole penetrating therethrough.

According to this configuration, upon injection molding of the second pinching portion, a molten resin for forming the second pinching portion is integrated with the first pinching portion through the hole of the embedded portion, so that detachment resistance of the coupling member with respect to the pinching member can be increased.

According to other advantageous aspect of the present invention, when the pull tab is tilted toward at least one of the front side and the rear side of the body, the protrusion and the pinching member are brought into contact with each other and the pinching member is elastically deformed, so that the protrusion locks the pull tab.

According to this configuration, due to the elastic deformation of the pinching member when the pull tab abuts against the protrusion of a pull tab attachment post during tilting of the pull tab, a user can cause the pinching member to go beyond the protrusion more easily, so as to lock the pull tab to the body.

According to one advantageous aspect of the present invention, there is provided a method for manufacturing a slider for slide fastener including: a body including a pull tab attachment post; and a pull tab including a coupling member and a pinching member, the coupling member including an exposed portion having a shaft portion rotatably coupled to the pull tab attachment post, and an embedded portion embedded in the pinching member. The method for manufacturing a slider for slide fastener includes: a body molding step of molding the body having a protrusion on at least one of a front end surface and a rear end surface of the pull tab attachment post, and the coupling member coupled to the pull tab attachment post of the body; a first pinching portion molding step of forming a first pinching portion of the pinching member by injection molding, the first pinching portion including an annular end portion having an opening through which the embedded portion is to be inserted, and when the pull tab is tilted toward at least one of a front side and a rear side of the body, the protrusion locks the pull tab to restrict rotation of the pull tab; an insertion step of inserting the embedded portion of the coupling member into the opening of the annular end portion of the first pinching portion; and a second pinching portion molding step of forming a second pinching portion to the first pinching portion with the embedded portion interposed therebetween by injection molding.

According to this configuration, when the injection molded body and coupling member are to be painted, since the pinching member of the pull tab, which can interfere with the protrusion of the pull tab attachment post, is formed separately in another step, the problem in the related art, that the painting applied to the portion of the protrusion of the pull tab attachment post that interferes with the pull tab of the slider having the "pull tab fixing function" capable of restricting the rotation of the pull tab is damaged, would not occur. Further, since the pinching member of the pull tab is separately formed and can be attached with a logo or a design, the problem in the related art, that the pull tab and the body are painted together and thus the film thickness of the painting in the portion of the logo or design formed by injection molding is uneven and the quality of the logo or the design is impaired, would not occur. Therefore, it is possible to manufacture a slider that has a pull tab fixing function and that can prevent damaging a painting of a pull tab attachment post due to a paint stuck to an interference portion between a protrusion and a pull tab, damaging a surface of a coupling body or a logo or design formed on the pull tab and generating burrs upon molding of a pull tab body.

According to other advantageous aspect of the present invention, the method for manufacturing a slider for slide fastener further includes: a painting step of painting the body and the coupling member after the body molding step and before the insertion step.

According to this configuration, it is possible to manufacture a slider that, even when injection molded body and coupling member are to be painted, can prevent damaging a painting of a pull tab attachment post due to a paint stuck to an interference portion between a protrusion and a pull tab, damaging an surface of a coupling body or a logo or design formed on the pull tab upon molding of a pull tab body.

According to other advantageous aspect of the present invention, in the body molding step, the body and the coupling member are formed by integrated injection molding.

According to this configuration, the body and the coupling member can be formed by a simple method.

BRIEF DESCRIPTION OF DRAWINGS

FIG. 5A is a perspective view of a first pinching portion before being integrated with a second pinching portion.

FIG. 5B is a side view of FIG. 5A.

FIG. 5C is a front view of FIG. 5A.

FIG. 5D is a plan view of FIG. 5A.

DESCRIPTION OF EMBODIMENTS

A slider 10 for slide fastener according to an embodiment of the present invention will be described below with reference to the drawings. The present invention is not limited to the embodiments described below, and various modifications can be made within the scope of the claims and the equivalents as long as they have substantially the same configuration as the present invention and achieve the same effect as the present invention.

Figure 2:
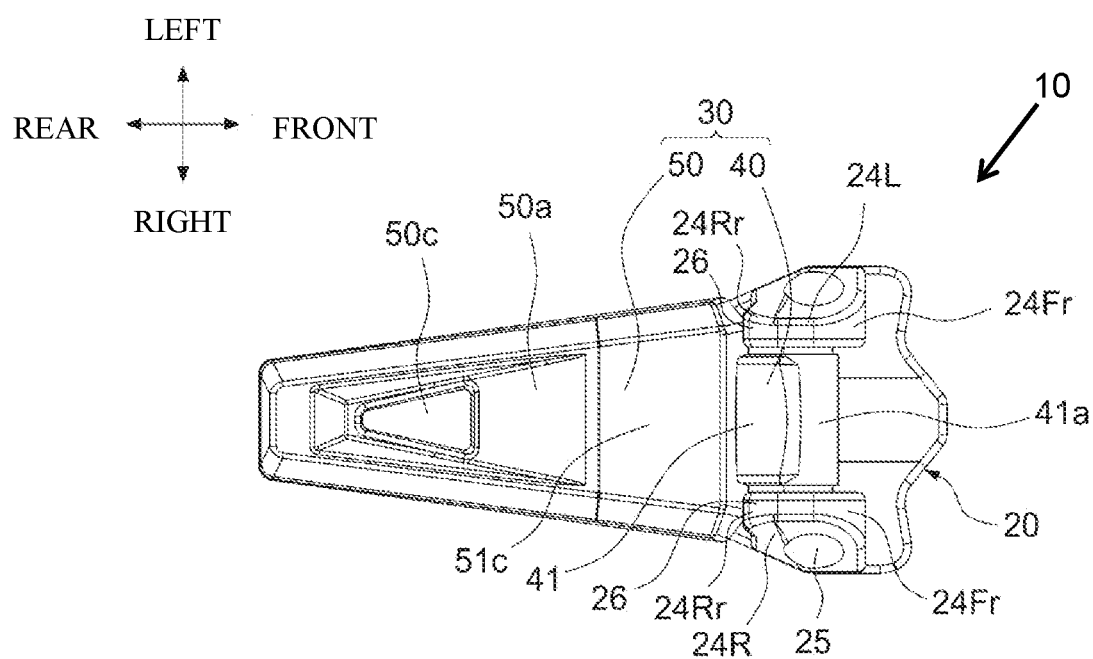
FIG. 2 is a plan view of FIG. 1.
Figure 3:
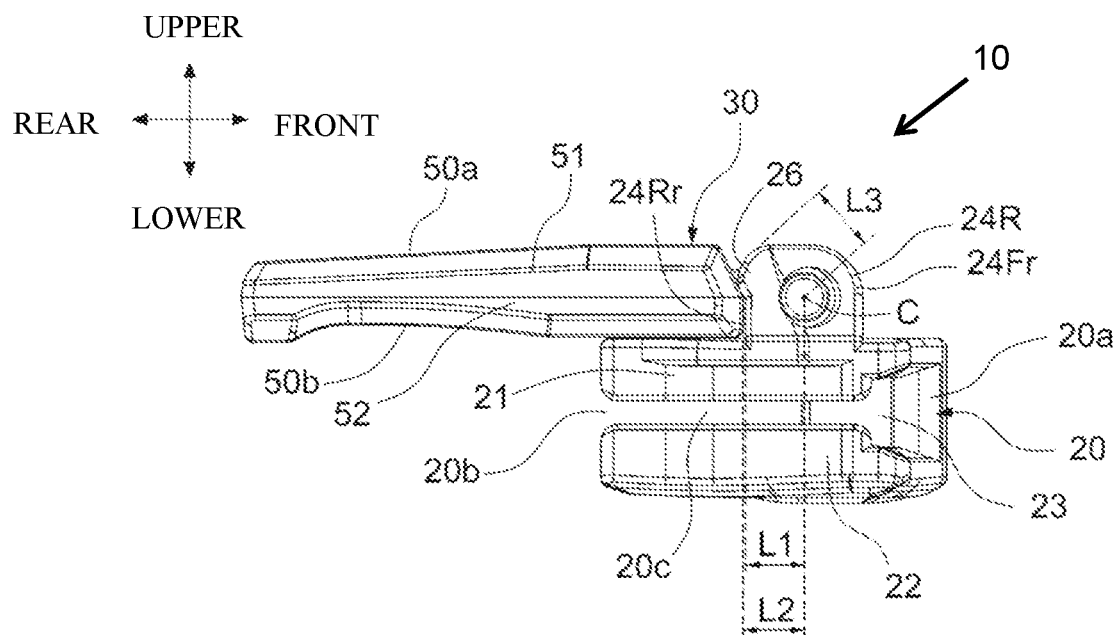
FIG. 3 is a side view of FIG. 1.

In the following description, as shown in FIG. 2, a front-rear direction of the slider 10 (hereinafter, also simply referred to as the "front-rear direction") is a direction that coincides with a moving direction of the slider 10. A direction in which a pair of fastener stringers (not shown) are closed when the slider 10 is moved is a front side (a shoulder mouths 20a side), and a direction in which the pair of fastener stringers are opened is a rear side (a rear mouth 20b side). A left-right direction of the slider 10 (hereinafter, also simply referred to as the "left-right direction") is a direction orthogonal to the front-rear direction in a plan view of the slider 10 in FIG. 2. As shown in a side view in FIG. 3, an upper-lower direction of the slider 10 is a direction orthogonal to the front-rear direction and the left-right direction. As shown in FIG. 2, a front-rear direction of a pull tab 30 is a direction from a coupling member 40 of the pull tab 30 toward a pinching member 50. In the present application, a side closer to the coupling member 40 is defined as a front side of the pinching member 50, and a side away from the coupling member 40 is defined as a rear side of the pinching member 50. As shown in FIG. 2, a left-right direction of the pull tab 30 is a direction orthogonal to the front-rear direction in a plan view of the pull tab 30. As shown in FIG. 3, an upper-lower direction of the pull tab 30 is a direction orthogonal to the front-rear direction and the left-right direction.

A slide fastener (not shown) includes, for example, the pair of fastener stringers (not shown) and the slider 10. The pair of fastener stringers are each attached with a row of fastener elements (not shown) on opposing tape side edges of a pair of fastener tapes (not shown). Due to forward movement of the slider 10, the left and right fastener stringers are closed, and the left and right fastener elements come into an engaged state. Further, due to rearward movement of the slider 10, the left and right fastener stringers are opened, and the left and right fastener elements come into a disengaged state.

First Embodiment

Figure 1:
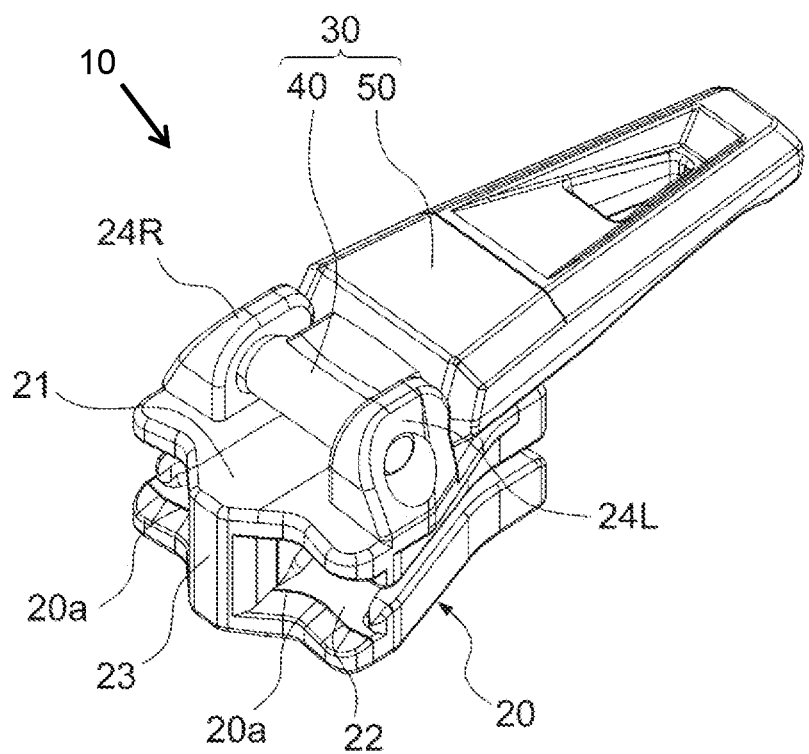
FIG. 1 is a perspective view of a slider for slide fastener according to a first embodiment of the present invention in a state where a pull tab is attached.

First, a first embodiment of the slider 10 for slide fastener according to the present invention will be described with reference to FIGS. 1 to 6D. FIG. 1 is a perspective view of the slider 10 according to the first embodiment of the present invention, and shows a state where the pull tab is attached. FIG. 2 is a plan view of FIG. 1. FIG. 3 is a side view of FIG. 1.

As shown in FIGS. 1 to 3, the slider 10 for slide fastener of the present embodiment includes a body 20 and the pull tab 30 rotatably provided with respect to the body 20.

As shown in FIGS. 2 and 3, the body 20 includes an upper blade 21, a lower blade 22 arranged away from and parallel to the upper blade 21, a guide post 23 that connects the upper blade 21 and the lower blade 22 at a front end portion, and a left pull tab attachment post 24L and a right pull tab attachment post 24R that are integrally formed so as to stand substantially perpendicular to a surface (upper surface) of the upper blade 21. In the present embodiment, the pull tab attachment posts 24L, 24R are integrally formed on the upper surface of the upper blade 21. However, the pull tab attachment posts 24L, 24R may be provided separately on the upper surface of the upper blade 21.

Due to the above configuration of the body 20, left and right shoulder mouths 20a separated by the guide post 23 are formed on a front portion of the body 20, and a rear mouth 20b is formed on a rear portion of the body 20. Further, a Y-shaped element guide path 20c is provided between the upper blade 21 and the lower blade 22, the Y-shaped element guide path 20c communicating the left and right shoulder mouths 20a and the rear mouth 20b. The element guide path 20c serves as a passage through which the left and right elements (not shown) are inserted when the slide fastener is constituted.

The pull tab 30 includes the coupling member 40 coupled to the pull tab attachment posts 24L, 24R of the body 20, and the pinching member 50 for operating the slider 10. The coupling member 40 is a plate-shaped member including an exposed portion 41 exposed from the pinching member 50 and an embedded portion 42 (to be described later) embedded in the pinching member 50.

The pinching member 50 includes a first pinching portion 51 made of resin and formed in advance by injection molding or the like, and a second pinching portion 52 provided so that the embedded portion 42 of the coupling member 40 is positioned between the first pinching portion 51 and the second pinching portion 52. As shown in FIGS. 2 and 3, the pinching member 50 is a member that has a front surface 50a and a back surface 50b and that is thicker than the coupling member 40.

In the present embodiment, the body 20 and the coupling member 40 are made of a metal such as a zinc alloy, a copper alloy, iron, or stainless steel, but are not limited thereto, and may also be members made of a synthetic resin. The coupling member 40 is generally subjected to surface treatment such as painting or plating in advance, but is not limited thereto.

The first pinching portion 51 is an intermediate member formed in advance by injection molding or the like. The first pinching portion 51 is made of a synthetic resin such as: a thermoplastic resin such as thermoplastic polyurethane (TPU), PET, nylon, polypropylene, polyurethane elastomer, polyethylene, or ABS resin; a thermosetting resin such as phenol resin, polyester, diallyl, epoxy, melamine, urea; or the like, but is preferably formed of a flexible material, but is not limited thereto. The second pinching portion 52 is a part that is injection molded to the first pinching portion 51 with the embedded portion 42 of the coupling member 40 interposed therebetween, and can be formed of the same material as the first pinching portion 51, for example, a thermoplastic resin, a thermosetting resin, or the like, but is not limited thereto.

Figure 4A:
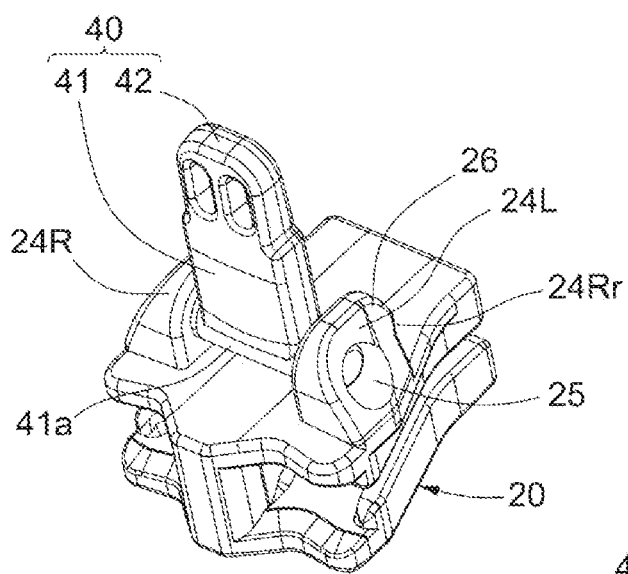
FIG. 4A is a perspective view of a slider for slide fastener according to the present invention in which a pinching member of the pull tab is omitted.
Figure 4B:
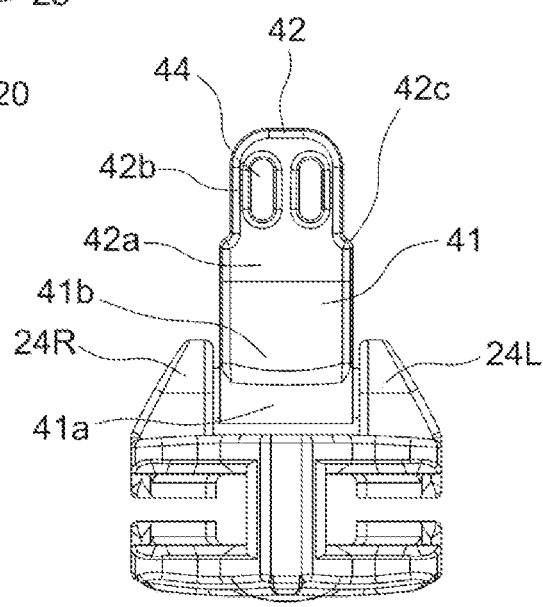
FIG. 4B is a front view of FIG. 4A.
Figure 4C:
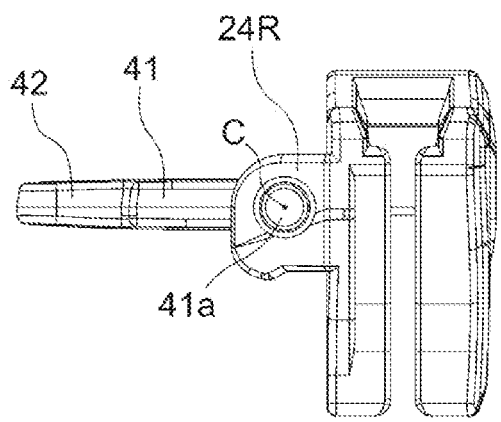
FIG. 4C is a side view of FIG. 4A.
Figure 6A:
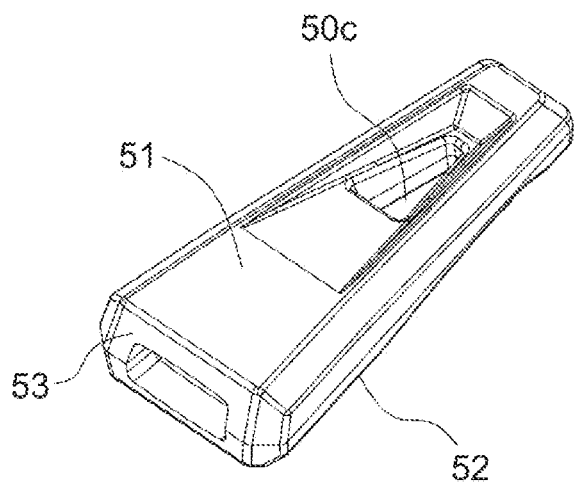
FIG. 6A is a perspective view of a state where a body and a coupling member are omitted and where the first pinching portion and the second pinching portion are integrated.
Figure 6B:
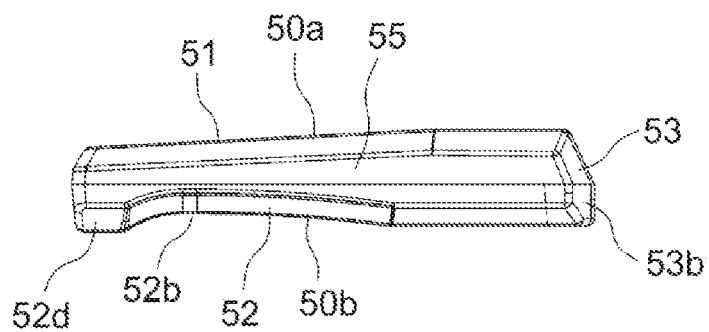
FIG. 6B is a side view of FIG. 6A.
Figure 6C:
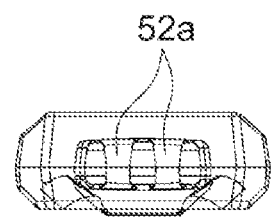
FIG. 6C is a front view of FIG. 6A.
Figure 6D:
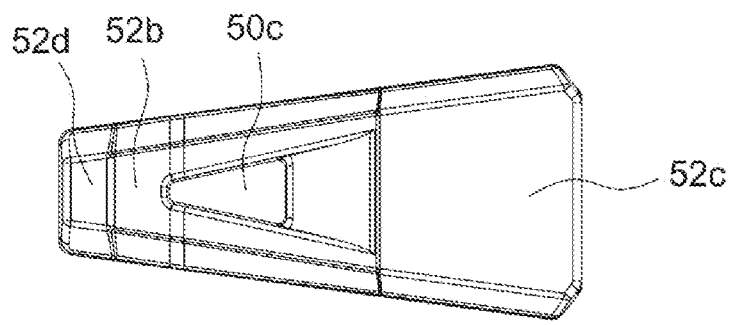
FIG. 6D is a plan view of FIG. 6A.

Next, components of the slider 10 for slide fastener according to the present invention will be described with reference to FIGS. 4A to 6D. FIG. 4A is a perspective view of the slider 10 with the pinching member 50 of the pull tab 30 omitted, and FIGS. 4B and 4C are respectively a front view and a side view of FIG. 4A. FIG. 5A is a perspective view of the first pinching portion 51 before being integrated with the second pinching portion 52, and FIGS. 5B, 5C, and 5D are respectively a side view, a front view, and a plan view of FIG. 5A. FIG. 6A is a perspective view of the first pinching portion 51 integrated with the second pinching portion 52, and FIGS. 6B, 6C, and 6D are respectively a side view, a front view, and a plan view of FIG. 6A.

As shown in FIGS. 4A to 4C, the coupling member 40 of the pull tab 30 includes a shaft portion 41a disposed in circular pull tab attachment holes 25 respectively formed in the left and right pull tab attachment posts 24L, 24R, the embedded portion 42 covered by the pinching member 50, and the exposed portion 41 that connects the shaft portion 41a and the embedded portion 42 without being covered by the pinching member 50. The coupling member 40 of the pull tab 30 is rotatably provided to the left and right pull tab attachment posts 24L, 24R of the body 20 via the shaft portion 41a.

The embedded portion 42 includes an enclosed portion 42a having a width in the left-right direction approximately equal to a left-right width of the exposed portion 41, and a deep portion 42b having a width in the left-right direction smaller than the width of the enclosed portion 42a in the left-right direction. As shown in FIG. 2, in the pull tab 30, the embedded portion 42 of the coupling member 40 is embedded in the pinching member 50.

In order to further increase the detachment resistance with respect to the embedded portion 42 of the coupling member 40, holes 44 can be formed in the deep portion 42b of the embedded portion 42. In the present embodiment, as an example, the deep portion 42b has two holes 44. However, the number of the holes 44 is not necessarily limited to this, and one or two or more holes may be provided. In the present embodiment, the holes 44 are penetrating holes that are long in the front-rear direction of the pull tab 30. However, the holes 44 may be holes of any shape. Furthermore, the holes 44 are provided in the deep portion 42b of the embedded portion 42 in the present embodiment, but may also extend to the enclosed portion 42a or may be provided in the enclosed portion 42a.

The pull tab 30 is formed to cover the embedded portion 42 together with the holes 44 when the second pinching portion 52 is formed by injecting to the first pinching portion 51 with the embedded portion 42 interposed therebetween. In this case, upon injection molding of the second pinching portion 52, the molten resin for forming the second pinching portion 52 flows through the holes 44 of the embedded portion 42 to the first pinching portion 51, and is integrated with the first pinching portion 51, so that the detachment resistance with respect to the embedded portion 42 of the coupling member 40 can be increased. Thus, the second pinching portion 52 can be coupled to the first pinching portion 51 through the holes 44 by filling the holes 44 of the embedded portion 42 with the second pinching portion 52, and thus the second pinching portion 52 can more firmly grip the embedded portion 42 and the first pinching portion 51, so that the pinching member 50 of the pull tab 30 can be formed more robustly. By providing a recessed portion or a convex portion without penetrating the embedded portion 42, the detachment resistance with respect to the embedded portion 42 of the coupling member 40 can be further increased as well.

The embedded portion 42 has a locking portion 42c for locking with a locked portion 54b of a housing portion 54 of the first pinching portion 51, which will be described later. Therefore, when the embedded portion 42 is housed in the housing portion 54, the locking portion 42c is brought into contact with the locked portion 54b, so that the first pinching portion 51 can be prevented from entering at an insufficiently depth, and thus relative positions of the first pinching portion 51 and the coupling member 40 can be reliably determined. Further, a distance L2 between contact portions 53b of the annular end portion 53 of the first pinching portion 51, which will be described later, and a rotation center C of the shaft portion 41a, can be reliably determined.

In the present embodiment, the locking portion 42c and the locked portion 54b are provided on the embedded portion 42 and the housing portion 54, respectively, but are not necessarily limited thereto. For example, the locking portion may be provided on the exposed portion 41, and the locked portion 54b may be provided on the annular end portion 53. Alternatively, a step may be provided on the exposed portion 41 as the locking portion 42c, and the annular end portion 53 of the first pinching portion 51 itself may serve as the locked portion 54b. Alternatively, the width of the exposed portion 41 in the left-right direction may be larger than the width of the opening 53a of the annular end portion 53 of the first pinching portion 51 in the left-right direction, and the exposed portion 41 may be brought into contact with the annular end portion 53 so that parts of the exposed portion 41 that protrude in the left-right direction with respect to the opening 53a serve as the locking portion 42c and the front end surface of the annular end portion 53 serves as the locked portion 54b.

In the present embodiment, as shown in FIGS. 5A to 5D, the first pinching portion 51 includes an annular end portion 53, which is a front end portion facing the pull tab attachment posts 24L, 24R, and a first pinching portion body 55. In the present embodiment, the annular end portion 53 has the opening 53a that is long in the left-right direction. The opening 53a is set to a size such that the annular end portion 53 encloses the embedded portion 42 of the coupling member 40 with a gap as small as possible.

As shown in FIGS. 5A and 5B, the first pinching portion body 55 has an outer surface serving as the front surface 50a of the pinching member 50 and a first molding surface 51a for forming the second pinching portion 52 on a surface thereof. The first pinching portion 51 has the housing portion 54 in which the embedded portion 42 of the coupling member 40 is housed upon injection molding of the second pinching portion 52 on the rear side of the annular end portion 53 of the first molding surface 51a. The housing portion 54 is a recessed portion recessed from the first molding surface 51a in a shape capable of housing the embedded portion 42 of the coupling member 40 in principle, and more preferably has a shape corresponding to the embedded portion 42.

Figure 7A:
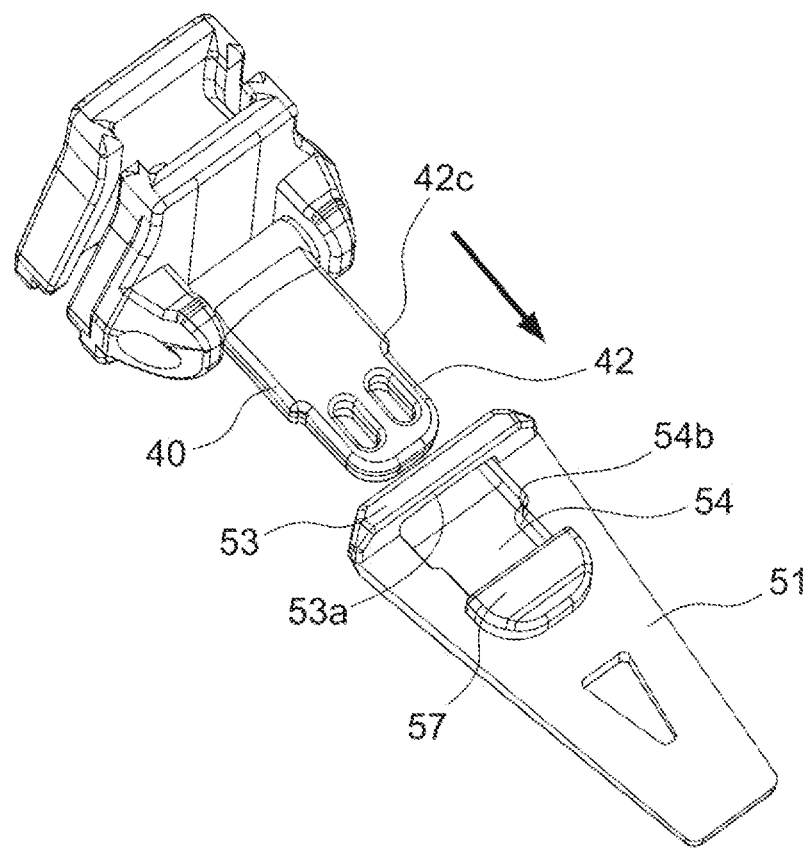
FIG. 7A is an explanatory view showing a method for manufacturing a slider for slide fastener according to the present invention.
Figure 7B:
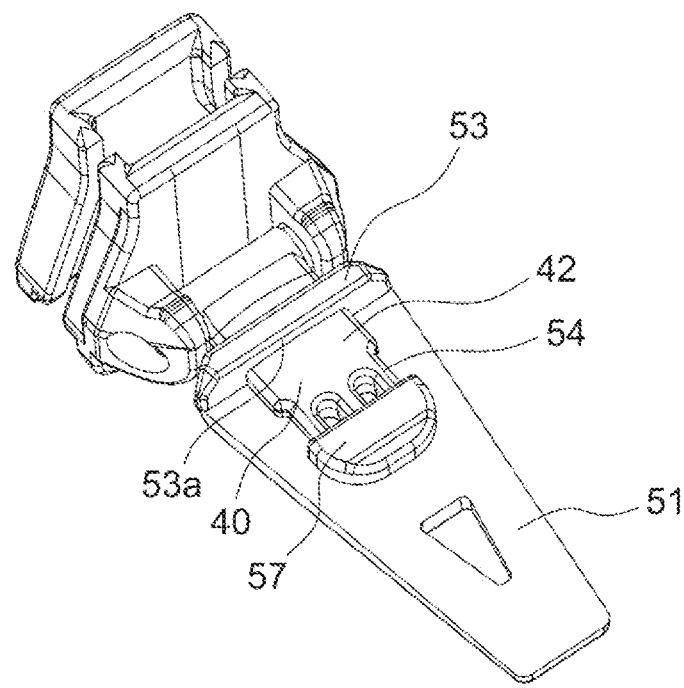
FIG. 7B is an explanatory view showing the method for manufacturing a slider for slide fastener according to the present invention.

In other words, in the present embodiment, as shown in FIGS. 7A and 7B, the first pinching portion body 55 includes the housing portion 54 that receives the embedded portion 42 of the coupling member 40 from the opening 53a of the annular end portion 53. When the embedded portion 42 of the coupling member 40 is inserted through the opening 53a of the annular end portion 53 of the first pinching portion 51 and housed in the housing portion 54, the embedded portion 42 of the coupling member 40 can be fitted into the first pinching portion 51. In a state where the embedded portion 42 of the coupling member 40 is fitted into the first pinching portion 51, the annular end portion 53 encloses an end portion of the embedded portion 42 that is adjacent to the exposed portion 41 of the coupling member 40. Then, as in a manufacturing method described later, the second pinching portion 52 is injection molded on the first molding surface 51a from the fitted state.

As shown in FIG. 5B, the annular end portion 53 is formed with contact portions 53b respectively protruding toward the pull tab attachment posts (24L, 24R) on both left and right sides of an end surface on the front side, that is, an end surface facing the pull tab attachment posts 24L, 24R. As shown in FIGS. 2 and 3, protrusions 26 are respectively formed on upper portions of surfaces of the left and right pull tab attachment posts 24L, 24R that respectively face the contact portions 53b of the annular end portion 53 when the pull tab 30 is tilted rearward with respect to the body 20 (toward the rear mouth 20b), that is, rear end surfaces 24Rr, 24Rr of the left and right pull tab attachment posts 24L, 24R in the front-rear direction, so as to engage with the contact portions 53b. After the pull tab 30 is tilted rearward with respect to the body 20, the protrusions 26 respectively engage with the contact portions 53b of the annular end portion 53 to restrict the pull tab 30 from rotating unnecessarily from the tilted state.

As a result, as shown in FIG. 3, when the pull tab 30 is tilted rearward of the slider 10, the contact portions 53b of the annular end portion 53 are respectively locked to the protrusions 26 of the left and right pull tab attachment posts 24L, 24R, and thus wobbling of the pull tab 30 is prevented and occurrence of contact sound between the pull tab 30 and the body 20 is prevented. A state where the pull tab 30 is tilted with respect to the body 20 and engaged with the pull tab attachment posts 24L, 24R refers to a state where the pull tab 30 is disposed on the upper surface of the upper blade 21 and the protrusions 26 of the pull tab attachment posts 24L, 24R respectively cover upper surface ends of the contact portions 53b of the annular end portion 53.

In the present embodiment, the protrusions 26 are formed only on the upper portions of the rear end surfaces 24Rr, 24Rr of the pull tab attachment posts 24L, 24R in the front-rear direction. However, the protrusions 26 may be formed on upper portions of both front end surfaces 24Fr, 24Fr and the rear end surfaces 24Rr, 24Rr of the pull tab attachment posts 24L, 24R in the front-rear direction, or may be formed only on the upper portions of the front end surfaces 24Fr, 24Fr of the pull tab attachment posts 24L, 24R in the front-rear direction. The protrusions 26 may be formed on an upright portion extending from the upper blade 21 of the body 20, or may be separately provided on the upper blade 21 of the body 20, not limited to the pull tab attachment posts 24L, 24R of the body 20.

As shown in FIG. 3, the distance L2 from the rotation center C of the shaft portion 41a to the contact portions 53b is greater than or equal to a distance L1 from the rotation center C of the shaft portion 41a to the rear end surfaces 24Rr, 24Rr, and is smaller than a distance L3 from the rotation center C of the shaft portion 41a to the protrusions 26 on the upper portions of the rear end surfaces 24Rr, 24Rr. That is, L3>L2≥L1 is satisfied.

As shown in FIG. 2, a pinching hole 50c is formed in the pinching member 50. By providing the pinching hole 50C, the pinching member 50 can be easily pinched between fingers, and an amount of material used for the pinching member 50 can be suppressed. Further, a recessed portion that is recessed without penetrating or a convex portion may be provided on the pinching member 50. Further, the pinching hole 50c may not be provided in the pinching member 50.

As shown in FIG. 5A, a front end of the housing portion 54 of the first pinching portion 51 communicates with the opening 53a of the annular end portion 53. The first pinching portion 51 includes a covering portion 57 formed to cover a portion closer to the rear of the housing portion 54. The covering portion 57 has a flange 57a slightly protruding from the first molding surface 51a, and a ceiling portion 57b connected to the flange 57a and covering a portion closer to the rear of the housing portion 54. Since the second pinching portion 52 is molded to the first pinching portion 51 with the embedded portion 42 interposed therebetween, the covering portion 57 can prevent the relative positions of the first pinching portion 51 and the embedded portion 42 from being displaced due to the synthetic resin flowing during molding of the second pinching portion 52. The flange 57a may be provided on both left and right sides of the housing portion 54 so as to be connected to the annular end portion 53.

In the present embodiment, as shown in FIG. 7B, the covering portion 57 is provided to cover a portion of the holes 44 of the embedded portion 42 of the coupling member 40.

In the present embodiment, as shown in FIG. 7B, when the embedded portion 42 of the coupling member 40 is housed in the housing portion 54, the housing portion 54 houses the embedded portion 42 without gap. However, a step or a slope may be formed between the embedded portion 42 and the housing portion 54. When the embedded portion 42 of the coupling member 40 is housed in the housing portion 54, a gap is formed between the embedded portion 42 and the housing portion 54 due to the step or the slope. Due to the gap, upon molding the second pinching portion 52, a molding material such as a resin can securely couple the embedded portion 42 of the coupling member 40 and the housing portion 54 of the first pinching portion 51 through the gap, in other words, the second pinching portion 52 can be firmly gripped by the coupling member 40 and the first pinching portion 51, so that the pinching member 50 can be formed robustly.

FIG. 6A is a perspective view of a state where the body and the coupling member are omitted and where the first pinching portion 51 and the second pinching portion 52 are integrated. FIGS. 6B, 6C, and 6D are respectively a side view, a front view, and a plan view of FIG. 6A. In the present embodiment, the first pinching portion 51 forms a half portion on a side of the annular end portion 53 and the front surface 50a of the pinching member 50, and the second pinching portion 52 forms a half portion on a side of the back surface 50b of the pinching member 50 except for the annular end portion 53 of the first pinching portion 51, however the front and back sides are relative to each other. That is, the first pinching portion 51 includes the annular end portion 53 and the first pinching portion body 55 extending from one of the front and back sides of the annular end portion 53 to form a half portion on the one of the front and back sides of the pinching member 50. The second pinching portion 52 forms a half portion on the other of the front and back sides of the pinching member 50. In this case, the first pinching portion 51 including the annular end portion 53 and the first pinching portion body 55 is formed in advance so as to form the half portion on the one of the front and back sides of the pinching member 50, and the second pinching portion 52 is injection molded and integrated to a surface on the other of the front and back sides of the first pinching portion body 55 of the first pinching portion 51, thereby forming the pinching member 50. In the present embodiment, the first pinching portion body 55 forms an front half portion of the pinching member 50, and the second pinching portion 52 forms an back half portion of the pinching member 50.

As shown in FIG. 6D, the pinching member 50 is formed in a trapezoidal shape with a width in the left-right direction decreasing from the front to the rear. However, the pinching member 50 may have any shape as long as the slider 10 can be operated. In the present embodiment, the pinching hole 50c has a shape corresponding to the pinching member 50, and is formed to have a longer front width and a shorter rear width.

As shown in FIG. 6C, the injection molded second pinching portion 52 has a post portion 52a that can be coupled to the first pinching portion 51 through the holes 44 of the embedded portion 42. The post portion 52a is formed by the molten resin for forming the second pinching portion 52 flowing through the holes 44 of the embedded portion 42 upon injection molding of the second pinching portion 52. The post portion 52a prevents the coupling member 40 from detaching from the pinching member 50, and thus the detachment resistance of the pinching member 50 with respect to the embedded portion 42 of the coupling member 40 can be increased.

As shown in FIG. 6B, the second pinching portion 52 has a recessed portion 52b recessed in a thickness direction of the pinching member 50. By providing the recessed portion 52b, when the pinching member 50 is pinched between fingers, the fingers are stopped by a projecting edge 52d at a rear end of the second pinching portion 52, and thus the pinching member 50 can be easily pinched between fingers, and the amount of material used for the pinching member 50 can be suppressed. Further, in the present embodiment, the contact portions 53b are formed on the annular end portion 53 of the first pinching portion 51. The contact portions 53b may also be formed on the second pinching portion 52 by reducing a height of the annular end portion 53 and making a front end of the second pinching portion 52 extend to a front end of the annular end portion 53 along the upper surface of the annular end portion 53. Further, as shown in FIG. 6D, a planar region 52c is formed on an outer surface of the second pinching portion 52 serving as the back surface 50b of the pinching member 50. For example, a logo, a mark, and a character can be arranged in the planar region 52c.

(Method for Manufacturing Slider 10 for Slide Fastener)

Next, a method for manufacturing the slider 10 for slide fastener according to the embodiment of the present invention will be described with reference to FIGS. 4A, 5A, and 7A to 7D.

First, the method for manufacturing the slider 10 includes a body molding step of molding the body 20 having the protrusions 26 on the front end surfaces 24Fr, 24Fr and/or the rear end surfaces 24Rr, 24Rr of the pull tab attachment posts 24L, 24R, and the coupling member 40 coupled to the pull tab attachment posts 24L, 24R of the body 20. In the body molding step, the protrusions 26 are formed on the front end surfaces 24Fr, 24Fr and/or the rear end surfaces 24Rr, 24Rr of the pull tab attachment posts 24L, 24R. In the present embodiment, the protrusions 26 are respectively formed on the upper portions of the rear end surfaces 24Rr, 24Rr of the pull tab attachment posts 24L, 24R. However, as described above, the protrusions 26 may be formed on the upper portions of the front end surfaces 24Fr, 24Fr of the pull tab attachment posts 24L, 24R, or may be formed on both upper portions of the front end surfaces 24Fr, 24Fr and upper portions of the rear end surfaces 24Rr, 24Rr.

In the present embodiment, the body 20 and the coupling member 40 of the pull tab 30 are formed by integrated injection molding at the same time. Specifically, the body 20 of the slider 10 and the coupling member 40 of the pull tab 30 connected to the pull tab attachment posts 24L, 24R of the body 20 are formed in a single time by integrated injection molding in a single mold. Further, in the present embodiment, the body 20 and the coupling member 40 are typically resin molded articles formed by integrated injection molding in a single time with a mold or the like using a synthetic resin, but are not limited thereto, and may be made of metal. Further, instead of integrated injection molding at the same time, the body 20 and the coupling member 40 may be separately molded and then combined with each other. When the body 20 and the coupling member 40 are molded separately, a composite of a resin and a metal can be used. Further, the body 20 and the coupling member 40 may be manufactured by utilizing a technique such as a 3D printer without being limited to injection molding, however integrated injection molding with a mold or the like is desirable in view of manufacturing cost, manufacturing time, and the like.

Next, the method for manufacturing the slider 10 includes a painting step of painting the body 20 and the coupling member 40. In the painting step, a surface treatment such as painting is applied to the body 20 and the coupling member 40 formed by integrated injection molding. In the present embodiment, the painting step is performed after the body molding step and before an insertion step described later. The surface treatment such as painting at this time has one advantage. The coupling member 40 is rotatable with respect to the body 20 without interfering the body 20, and thus does not have a defect that the paint of the body 20 and the coupling member 40 is stuck and damages the body 20 and the coupling member 40 even if the body 20 and the coupling member 40 are painted. When the body 20 and the coupling member 40 are separately molded, the body 20 and the coupling member 40 may be combined after being subjected to the surface treatment such as painting. As described above, in the present embodiment, when the body 20 and the coupling member 40 formed in the previous step are to be painted, since the pinching member 50 of the pull tab 30, which can interfere with the protrusions 26 of the pull tab attachment posts 24L, 24R, is formed separately in another step, the problem in the related art, that the painting applied to the portions of the protrusions of the pull tab attachment posts that interfere with the pull tab of the slider having the "pull tab fixing function" capable of restricting the rotation of the pull tab is damaged, would not occur.

Next, the method for manufacturing the slider 10 includes a first pinching portion molding step of forming the first pinching portion 51 of the pinching member 50 by injection molding. The first pinching portion 51 includes the annular end portion 53 having the opening 53a through which the embedded portion 42 is to be inserted, and when the pull tab 30 is tilted toward the front side and/or the rear side of the body 20, the protrusions 26 lock the pull tab 30 to restrict rotation of the pull tab 30. In the present embodiment, the first pinching portion 51 is formed in advance by injection molding or the like. As shown in FIG. 5A, in the first pinching portion molding step, the first pinching portion 51 is formed to have the annular end portion 53 having the opening 53a and the first pinching portion body 55 having the housing portion 54. In the first pinching portion molding step, the annular end portion 53 is formed with the contact portions 53b that can be in contact with and interfere with the protrusions 26.

As shown in FIGS. 2 and 5A, a planar region 51c for arranging a logo, a mark, and a character is formed on an outer surface of the first pinching portion 51 serving as the front surface 50a of the pinching member 50. In the planar region 51c, a logo or a design can be attached. The logo or design can be formed at the same time when the first pinching portion 51 is injection molded with a mold or the like. As described above, in the present embodiment, when the body 20 and the coupling member 40 formed in the previous step are to be painted, since the pinching member 50 of the pull tab 30 is separately formed and can be attached with a logo or a design, the problem in the related art, that the pull tab and the body are painted together and thus the film thickness of the painting in the portion of the logo or design formed by injection molding is uneven and the quality of the logo or the design is impaired, would not occur. The logo or design may also be applied in the planar region 51c of the molded first pinching portion 51 by printing or pasting.

In the present embodiment, the pinching member 50 of the pull tab 30 is formed in another step separately from the coupling member 40, and a logo or design can be formed on the first pinching portion 51 in this step; therefore, when a plurality of types of logos or designs are present, a mold for forming the first pinching portion 51 may be customized alone, while an apparatus for forming the body 20, the coupling member 40, and the second pinching portion 52 may be used as it is. Thereby, logos or designs for different customers can be easily handled by simply changing the mold for forming the first pinching portion 51.

Next, as shown in FIGS. 7A and 7B, the method for manufacturing the slider 10 includes an insertion step of inserting the embedded portion 42 of the coupling member 40 into the opening 53a of the annular end portion 53 of the first pinching portion 51. Specifically, prior to injection molding of the second pinching portion 52, the embedded portion 42 of the coupling member 40 is inserted from the opening 53a of the annular end portion 53 of the first pinching portion 51 in a direction shown in FIG. 7A to be disposed in the housing portion 54 of the first pinching portion 51. FIG. 7B is an explanatory view showing a state where the embedded portion 42 of the coupling member 40 is housed in the housing portion 54 of the first pinching portion 51. As a result, the embedded portion 42 of the coupling member 40 is fitted into the first pinching portion 51. In this state, the annular end portion 53 encloses the end portion of the embedded portion 42 that is adjacent to the exposed portion 41 of the coupling member 40 substantially without gap. In this state, due to the locking portion 42c of the embedded portion 42 and the locked portion 54b of the housing portion 54 locking to each other, the relative positions of the first pinching portion 51 and the coupling member 40 can be determined.

Figure 7C:
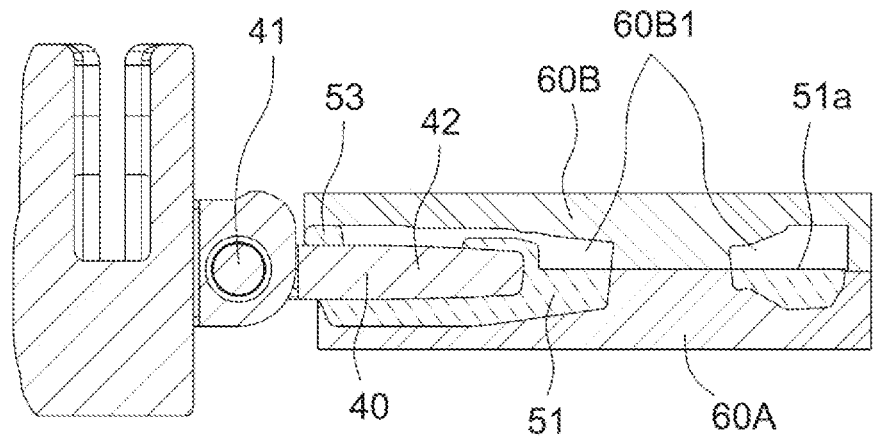
FIG. 7C is an explanatory view showing the method for manufacturing a slider for slide fastener according to the present invention.

Next, the method for manufacturing the slider 10 includes a second pinching portion molding step of forming the second pinching portion 52 to the first pinching portion 51 with the embedded portion 42 interposed therebetween by injection molding. As shown in FIG. 7C, the first pinching portion 51 is disposed in first and second molding dies 60A, 60B together with the coupling member 40. In the present embodiment, the embedded portion 42 and the first pinching portion 51 are disposed in the first and second molding dies 60A, 60B in a state where the embedded portion 42 of the coupling member 40 is housed in the housing portion 54 of the first pinching portion 51. The pair of first and second molding dies 60A, 60B are used to inject the synthetic resin to the first molding surface 51a of the first pinching portion 51, and thereby the second pinching portion 52 is formed by injection molding with the embedded portions 42 interposed therebetween.

FIG. 7C is a partial cross-sectional view schematically showing a state where the first pinching portion 51 is laterally disposed between the first and second molding dies 60A, 60B with the embedded portion 42 of the coupling member 40 housed in the housing portion 54. The first pinching portion 51 is disposed in the first molding die 60A with the first molding surface 51a facing upward. The second molding die 60B is provided with a cavity 60B1 which is a space for molding the second pinching portion 52 on the first molding surface 51a of the first pinching portion 51. Although not shown, the cavity 60B1 on an inner surface of the second molding die 60B may be provided with unevenness for attaching a logo or a design to the outer surface of the second pinching portion 52 serving as the back surface 50b of the pinching member 50.

In the arrangement state of the coupling member 40 and the first pinching portion 51 shown in FIG. 7C, the annular end portion 53 of the first pinching portion 51 is disposed at a left end portion of the cavity 60B1 in the drawing, that is, an end portion of the cavity 60B1 that is adjacent to the exposed portion 41 of the coupling member 40. In other words, in the present description, the cavity 60B1 includes a space for molding the second pinching portion 52 and a space for disposing the annular end portion 53. The second pinching portion 52 is formed such that substantially no step is present between the annular end portion 53 and the second pinching portion 52.

Next, the molten resin is injected into the cavity 60B1 between the first and second molding dies 60A, 60B to form the second pinching portion 52. Thus, the second pinching portion 52 is formed integrally on the first molding surface 51a of the first pinching portion 51 with the embedded portion 42 of the coupling member 40 interposed therebetween. As a result, the first pinching portion 51 and the second pinching portion 52 are integrated to form the pinching member 50, and the pull tab 30 is completed.

Upon injection molding of the second pinching portion 52, the molten resin for forming the second pinching portion 52 reaches the first pinching portion 51 through the holes 44 of the embedded portion 42 to form the post portion 52a, and thus the post portion 52a prevents the coupling member 40 from detaching from the pinching member 50. Thus, the detachment resistance of the pinching member 50 with respect to the coupling member 40 can be increased.

The annular end portion 53 remains as the end portion of the pinching member 50 that is adjacent to the exposed portion 41 of the coupling member 40. Further, by disposing the annular end portion 53 at the end portion adjacent to the exposed portion 41 of the coupling member 40 in the cavity 60B1 upon injection molding of the second pinching portion 52, mold clamping between the first and second molding dies 60A, 60B that is needed at a boundary between the exposed portion 41 and the embedded portion 42 of the coupling member 40 can be received at the annular end portion 53. Therefore, it is possible to substantially eliminate a situation that the surface of the exposed portion 41 of the coupling member 40 is damaged by mold clamping, or the surface treatment such as painting or plating is impaired.

Further, upon injection molding of the second pinching portion 52, the annular end portion 53 of the first pinching portion 51 encloses the end portion of the embedded portion 42 that is adjacent to the exposed portion 41 of the coupling member 40 substantially without gap, and thus it is possible to substantially prevent occurrence of burrs in the exposed portion 41 of the coupling member 40 due to the molten resin going beyond the annular end portion 53.

As shown in FIG. 7C, the first and second molding dies 60A, 60B are pressed against the annular end portion 53 of the first pinching portion 51 instead of the coupling member 40 of the body 20 or the pull tab 30, and thus it is possible to substantially eliminate a situation that the surface treatment such as the painted painting layer of the body 20 or the coupling member 40 of the pull tab 30 is damaged by the first and second molding dies 60A, 60B.

In the present embodiment, the coupling member 40 includes the exposed portion 41 and the embedded portion 42 extending rearward of the exposed portion 41. However, the coupling member 40 may further include a second exposed portion (not shown) extending rearward of the embedded portion 42. In this case, the second exposed portion is exposed from a rear side of the first pinching portion 51 and the second pinching portion 52.

Figure 8A:
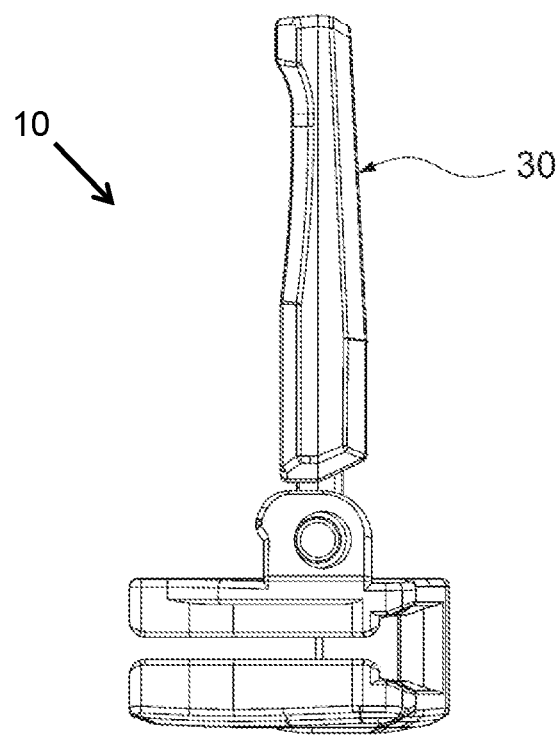
FIG. 8A is a side view for explaining a state where the pull tab of the slider for slide fastener according to the present invention is rotated from an upright state to an engaged state.

Next, a state where the pull tab 30 of the slider 10 is rotated from an upright state to an engaged state will be described with reference to FIGS. 8A to 8E. FIG. 8A is a side view showing the upright state of the pull tab 30 of the slider 10. In this state, for example, the user holds the pull tab 30 with fingers so as to raise the pull tab 30.

Figure 8B:
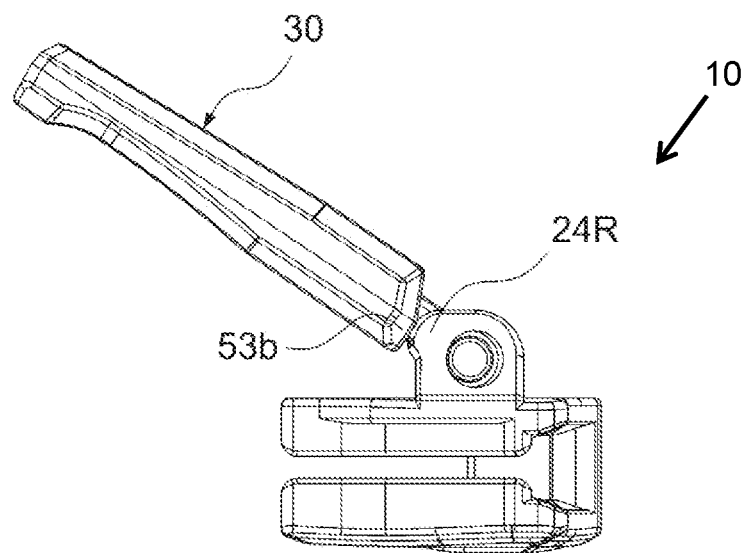
FIG. 8B is a side view for explaining a state where the pull tab of the slider for slide fastener according to the present invention is rotated from the upright state to the engaged state.

At this time, when the fingers leave the pull tab 30, the pull tab 30 is tilted rearward due to its own weight, for example. Or when the user rotates the pull tab 30 rearward, as shown in FIG. 8B, the contact portions 53b are respectively brought into contact with the pull tab attachment posts 24L, 24R, and the pull tab 30 is in a position where the pull tab 30 can be easily pinched even if a hand is temporarily released during operation due to a tilted state inclined obliquely in a side view as shown in FIG. 8B, and thus it is possible to improve the convenience upon operation of the pull tab 30.

Figure 8C:
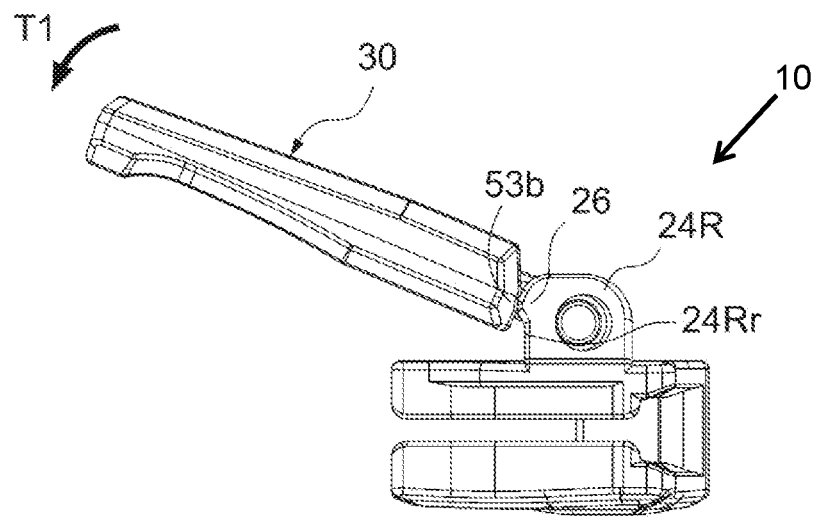
FIG. 8C is a side view for explaining a state where the pull tab of the slider for slide fastener according to the present invention is rotated from the upright state to the engaged state.

FIG. 8C shows a state where the tilted pull tab 30 is tilted further downward. As shown in FIG. 8C, a rotation downward force T1 is applied to the tilted pull tab 30, and the contact portions 53b of the pull tab 30 gradually go beyond the protrusions 26 of the pull tab attachment posts 24L, 24R while in contact with the protrusions 26 and descend along the rear end surfaces 24Rr, 24Rr of the pull tab attachment posts 24L, 24R. In the present embodiment, since the pinching member 50 of the pull tab 30 is formed of an elastically deformable resin material, when the contact portions 53b are pressed against the pull tab attachment posts 24L, 24R, the protrusions 26 of the pull tab attachment posts 24L, 24R and the contact portions 53b of the pinching member 50 of the pull tab 30 are brought into contact with each other, and thus the contact portions 53b of the pinching member 50 are elastically deformed and the protrusions 26 engage with the pull tab 30.

Figure 8D:
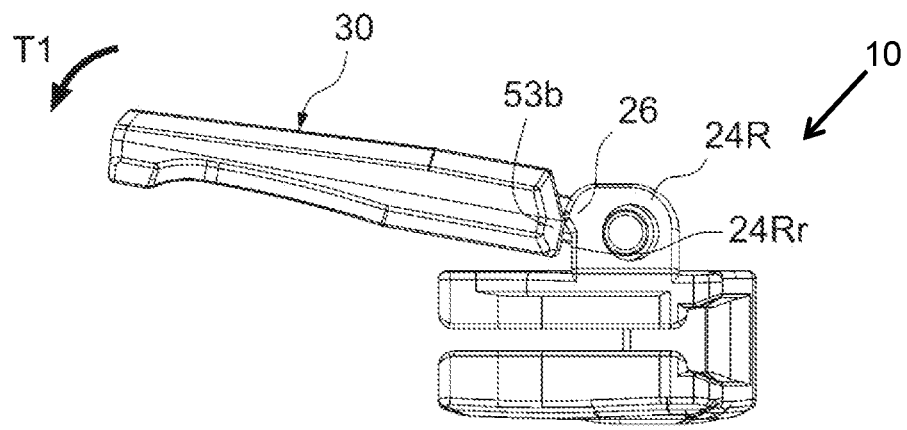
FIG. 8D is a side view for explaining a state where the pull tab of the slider for slide fastener according to the present invention is rotated from the upright state to the engaged state.
Figure 8E:
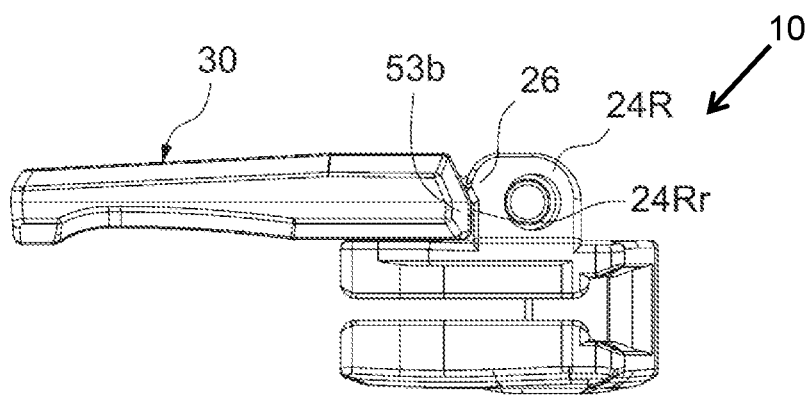
FIG. 8E is a side view for explaining a state where the pull tab of the slider for slide fastener according to the present invention is rotated from the upright state to the engaged state.

FIG. 8D shows a state immediately after the contact portions 53b of the pull tab 30 go beyond the protrusions 26 of the pull tab attachment posts 24L, 24R. When the rotation force T1 is further applied to the pull tab 30 from the state in FIG. 8C, the contact portions 53b of the pull tab 30 further rotate beyond the protrusions 26 of the pull tab attachment posts 24L, 24R, as shown in FIG. 8D. Finally, as shown in FIG. 8E, the pull tab 30 is in the engaged state of being engaged with the pull tab attachment posts 24L, 24R. In this state, the pull tab 30 is disposed on the upper surface of the upper blade 21, and the protrusions 26 of the pull tab attachment posts 24L, 24R are contact with the upper surface ends of the contact portions 53b of the pull tab 30.

Hereinafter, a slider 10 for slide fastener and a method of manufacturing the slider 10 according to the second embodiment will be described with reference to FIGS. 9A to 9C. In the description of the second embodiment and the reference drawings, members having the same configurations as those described in the above embodiment are denoted by the same reference signs, and the description of the members is omitted by using the same reference signs.

Figure 9A:
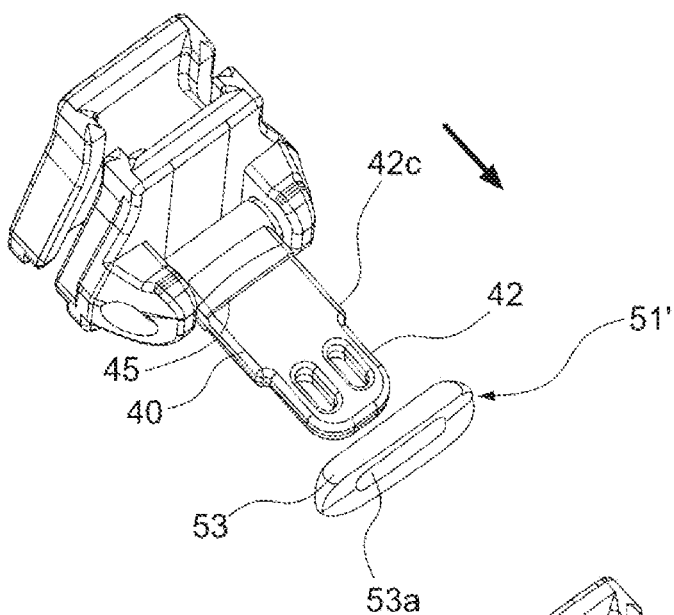
FIG. 9A is an explanatory view showing a slider for slide fastener and a method for manufacturing the slider of a second embodiment.

In the second embodiment, as shown in FIG. 9A, the first pinching portion 51' is different from the first embodiment by including only the annular end portion 53. In other words, the first pinching portion 51' only includes the annular end portion 53, and does not include a part corresponding to the first pinching portion body 55 of the first pinching portion 51 described in the first embodiment. On the other hand, a second pinching portion 52' is a part of the pinching member 50 in which the annular end portion 53 is excluded. In other words, the second pinching portion 52' corresponds to the first pinching portion body 55 and the second pinching portion 52 of the first pinching portion 51 described in the first embodiment.

Figure 9B:
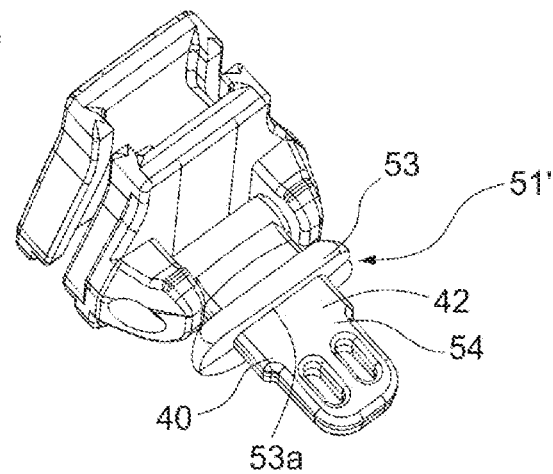
FIG. 9B is an explanatory view showing the slider for slide fastener and the method for manufacturing the slider of the second embodiment.
Figure 9C:
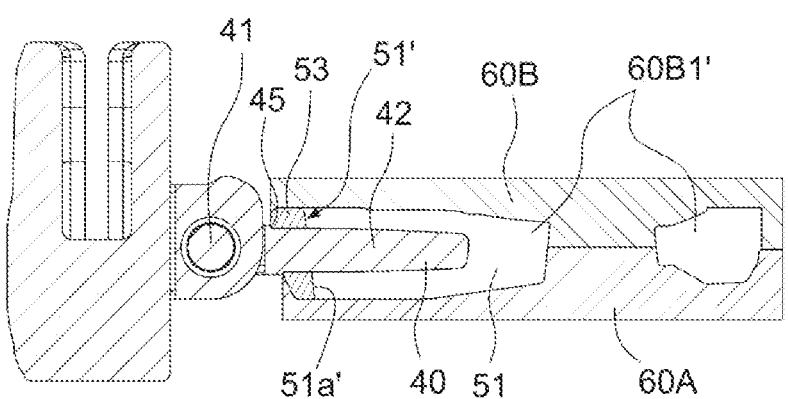
FIG. 9C is an explanatory view showing the slider for slide fastener and the method for manufacturing the slider of the second embodiment.

As shown in FIGS. 9A and 9B, the method of manufacturing the slider 10 for slide fastener of the second embodiment similarly includes an insertion step of inserting the embedded portion 42 of the coupling member 40 into the opening 53a of the annular end portion 53 of the first pinching portion 51'. Further, for example, a step 45 as shown in FIG. 9A may be formed on a coupling member 40' so as to position the annular end portion 53 inserted into the opening 53a at an appropriate position. In addition to the step, the width of the exposed portion 42 may also be set larger than the width of the opening 53a.

Figure 7D:
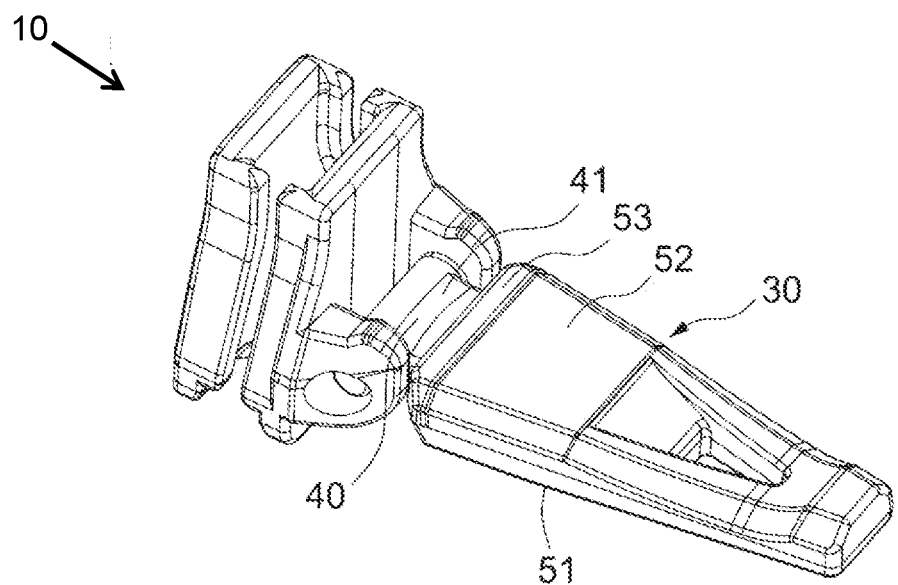
FIG. 7D is an explanatory view showing the method for manufacturing a slider for slide fastener according to the present invention.

Next, the method for manufacturing the slider 10 includes a second pinching portion molding step of forming the second pinching portion 52' to the first pinching portion 51' with the embedded portion 42 interposed therebetween by injection molding. As shown in FIG. 9C, in a state where the embedded portion 42 of the coupling member 40 is inserted into the opening 53a of the annular end portion 53, the annular end portion 53 as the first pinching portion 51' is disposed in the first and second molding dies 60A, 60B together with the embedded portion 42 of the coupling member 40. The synthetic resin is injected into the pair of first and second molding dies 60A, 60B, and thus the second pinching portion 52' is formed to a first molding surface 51a' of the first pinching portion 51' with the embedded portions 42 interposed therebetween by injection molding. As a result, the molten resin injected into the cavity 60B1' between the first and second molding dies 60A, 60B becomes the pinching member 50 in which the first pinching portion 51 and the second pinching portion 52 are integrated as shown in FIG. 7D, and the pull tab 30 is completed.

In such configuration, similarly as in the first embodiment, when the body 20 and the coupling member 40 formed in the previous step are to be painted, since the pinching member 50' of the pull tab 30, which can interfere with the protrusions 26 of the pull tab attachment posts 24L, 24R, is formed separately in another step, the problem in the related art, that the painting applied to the portions of the protrusions of the pull tab attachment posts that interfere with the pull tab of the slider is damaged, would not occur. Further, since the pinching member 50' of the pull tab 30 is separately formed and can be attached with a logo or a design, the problem in the related art, that the pull tab and the body are painted together and thus the film thickness of the painting in the portion of the logo or design formed by injection molding is uneven and the quality of the logo or the design is impaired, would not occur.

Hereinafter, a slider 10" for slide fastener and a method of manufacturing the slider 10" according to the third embodiment will be described with reference to FIGS. 10A to 10B. In the description of the third embodiment and the reference drawings, members having the same configurations as those described in the above embodiment are denoted by the same reference signs, and the description of the members is omitted by using the same reference signs.

Figure 10A:
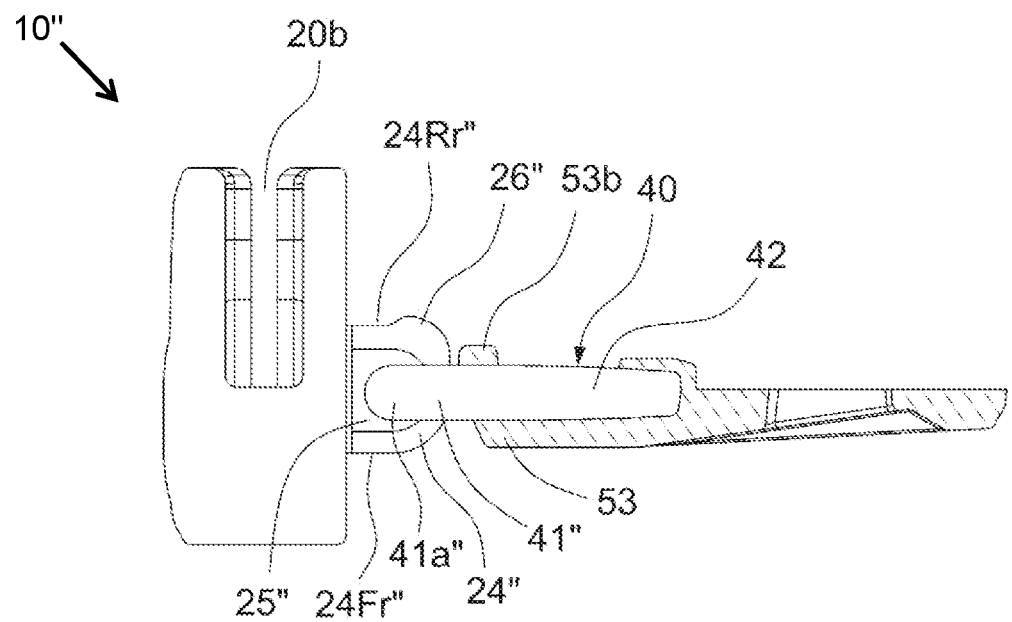
FIG. 10A is an explanatory view showing a slider for slide fastener according to a third embodiment.
Figure 10B:
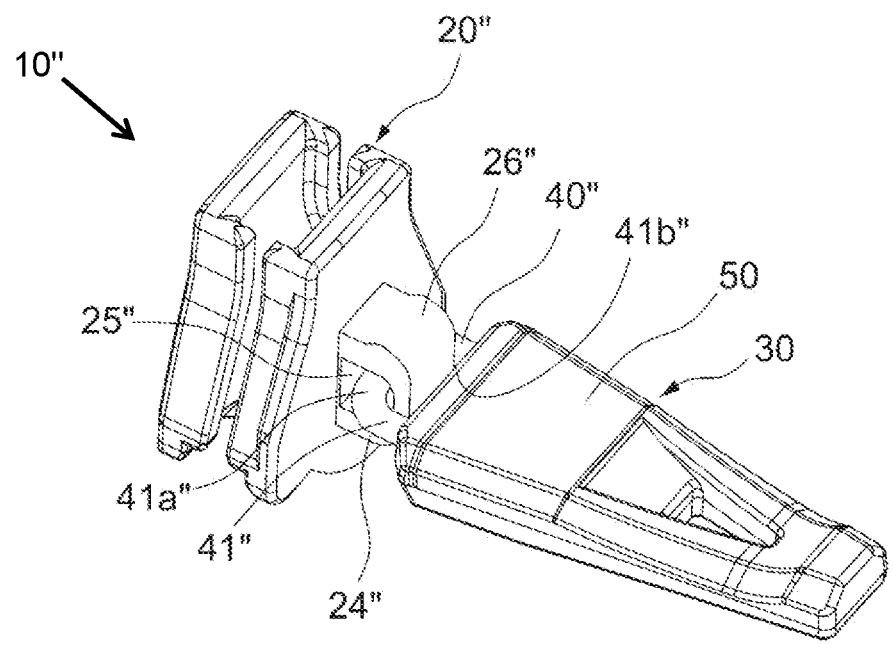
FIG. 10B is an explanatory view showing the slider for slide fastener according to the third embodiment.

In the third embodiment, as shown in FIGS. 10A and 10B, the coupling member 40 of the pull tab 30 is different from the first embodiment in that a pull tab attachment post 24" is a single cover member. The coupling member 40" of the pull tab 30 includes a shaft portion 41a" disposed in a pull tab attachment hole 25" formed by the pull tab attachment post 24", an embedded portion 42 covered by the pinching member 50, and two exposed portions 41" extending from both sides of the shaft portion 41a" without being covered by the pinching member 50 and connecting the shaft portion 41a" and the embedded portion 42. In the third embodiment, the shaft portion 41a", the exposed portion 41", and the embedded portion 42 form a substantially square attachment hole 41b" through which the one pull tab attachment post 24" is inserted.

In the third embodiment, a protrusion 26" is formed on an upper portion of a surface of the pull tab attachment post 24" that faces the contact portion 53b of the annular end portion 53, that is, a rear end surface 24Rr" of the pull tab attachment post 24" in the front-rear direction, so as to engage with the contact portion 53b when the pull tab 30 is tilted rearward with respect to a body 20" (toward the rear mouth 20b). Similarly as the first embodiment, the protrusion 26" is in contact with the contact portion 53b of the annular end portion 53 of the pinching member 50 of the pull tab 30 in a state covering the upper surface end of the contact portion 53b when the pull tab 30 is tilted rearward, and thereby restricts the pull tab 30 from rotating unnecessarily from the tilted state. As a result, when the pull tab 30 is tilted rearward of the slider 10", the contact portion 53b of the annular end portion 53 is locked to the pull tab attachment post 24", and thus wobbling of the pull tab 30 is prevented. The protrusion 26" may be formed on upper portions of both a front end surface 24Fr" and the rear end surface 24Rr" of the pull tab attachment post 24" in the front-rear direction, or may be formed only on the upper portion of the front end surface 24Fr" of the pull tab attachment post 24" in the front-rear direction.

In the method for manufacturing the slider 10" for slide fastener of the third embodiment, similarly as the manufacturing method of the first embodiment shown in FIGS. 7A to 7D, the embedded portion 42 of the coupling member 40" is inserted into the opening 53a of the annular end portion 53 of the first pinching portion 51, and in this state, the first pinching portion 51 is disposed in the first and second molding dies 60A, 60B together with the embedded portion 42 of the coupling member 40". The synthetic resin is injected, and thus the second pinching portion 52 is formed to the first molding surface 51a of the first pinching portion 51 with the embedded portions 42 interposed therebetween by injection molding. As a result, the molten resin injected into the cavity 60B1 between the first and second molding dies 60A, 60B becomes the pinching member 50 in which the first pinching portion 51 and the second pinching portion 52 are integrated as shown in FIG. 7D, and the pull tab 30 is completed. By the same method as in the second embodiment shown in FIGS. 9A to 9C, the first pinching portion 51' includes only the annular end portion 53, the second pinching portion 52' is a part of the pinching member 50 in which the annular end portion 53 is excluded, and the pinching member 50 in which the first pinching portion 51 and the second pinching portion 52 are integrated may be formed by the molten resin injected into the cavity 60B1' between the first and second molding dies 60A, 60B, and thus the description thereof will be omitted.

In such configuration, similarly as the first embodiment, the problem in the related art, that the painting applied to the portions of the protrusions of the pull tab attachment posts that interfere with the pull tab of the slider is damaged, would not occur. In addition, the problem in the related art, that the pull tab and the body are painted together and thus the film thickness of the painting in the portion of the logo or design formed by injection molding is uneven and the quality of the logo or the design is impaired, would not occur.

Although the embodiments of the present invention have been described above with reference to the drawings, specific configurations are not limited to these embodiments. The scope of the present invention is indicated not by the above description of the embodiment but by the claims, and includes all modifications within the meaning and range equivalent to the claims.

What is claimed is:
1. A slider for slide fastener comprising:
a body including an upper blade, a lower blade, a guide post that connects the upper blade and the lower blade, and a pull tab attachment post erected on an upper surface of the upper blade; and a pull tab coupled to the pull tab attachment post, wherein the pull tab includes:
- a coupling member including an exposed portion having a shaft portion rotatably coupled to the pull tab attachment post, and an embedded portion; and
- a pinching member including a first pinching portion including an annular end portion having an opening through which the embedded portion is to be inserted, and a second pinching portion provided to the first pinching portion with the embedded portion interposed therebetween, wherein at least one of a front end surface and a rear end surface of the pull tab attachment post has a protrusion, wherein when the pull tab is tilted toward at least one of a front side and a rear side of the body, the protrusion locks the pull tab to restrict rotation of the pull tab, wherein the annular end portion is formed with a contact portion protruding toward the pull tab attachment post on at least one of left and right sides on an end surface facing the pull tab attachment post, and wherein the contact portion is formed to contact with the protrusion while the pull tab is tilted toward at least one of the front side and the rear side of the body.

2. The slider for slide fastener according to claim 1, wherein the embedded portion defines a hole penetrating therethrough.

3. The slider for slide fastener according to claim 1, wherein when the pull tab is tilted toward at least one of the front side and the rear side of the body, the protrusion and the pinching member are brought into contact with each other and the pinching member is elastically deformed, so that the protrusion locks the pull tab.

4. The slider for slide fastener according to claim 1, wherein the first pinching portion includes a first pinching portion body including a housing portion configured to house the embedded portion.

5. The slider for slide fastener according to claim 4, wherein the embedded portion defines a hole penetrating therethrough.

6. The slider for slide fastener according to claim 4, wherein when the pull tab is tilted toward at least one of the front side and the rear side of the body, the protrusion and the pinching member are brought into contact with each other and the pinching member is elastically deformed, so that the protrusion locks the pull tab.

7. The slider for slide fastener according to claim 4, wherein the embedded portion includes a locking portion, wherein the housing portion includes a locked portion, and wherein the locking portion and the locked portion are used for determining relative positions of the first pinching portion and the coupling member.

8. The slider for slide fastener according to claim 7, wherein the embedded portion defines a hole penetrating therethrough.

9. The slider for slide fastener according to claim 7, wherein when the pull tab is tilted toward at least one of the front side and the rear side of the body, the protrusion and the pinching member are brought into contact with each other and the pinching member is elastically deformed, so that the protrusion locks the pull tab.

10. The slider for slide fastener according to claim 7, wherein the housing portion includes a covering portion formed to cover a portion of the embedded portion when the embedded portion is housed in the housing portion.

11. The slider for slide fastener according to claim 10, wherein the embedded portion defines a hole penetrating therethrough.

12. The slider for slide fastener according to claim 10, wherein when the pull tab is tilted toward at least one of the front side and the rear side of the body, the protrusion and the pinching member are brought into contact with each other and the pinching member is elastically deformed, so that the protrusion locks the pull tab.

13. A method for manufacturing a slider for slide fastener including: a body including a pull tab attachment post; and a pull tab including a coupling member and a pinching member, the coupling member including an exposed portion having a shaft portion rotatably coupled to the pull tab attachment post, and an embedded portion embedded in the pinching member, the method for manufacturing the slider for slide fastener comprising:
- a body molding step of molding the body having a protrusion on at least one of a front end surface and a rear end surface of the pull tab attachment post, and the coupling member coupled to the pull tab attachment post of the body;
- a first pinching portion molding step of forming a first pinching portion of the pinching member by injection molding, the first pinching portion including an annular end portion having an opening through which the embedded portion is to be inserted, and when the pull tab is tilted toward at least one of a front side and a rear side of the body, the protrusion locks the pull tab to restrict rotation of the pull tab;
- an insertion step of inserting the embedded portion of the coupling member into the opening of the annular end portion of the first pinching portion;
- a second pinching portion molding step of forming a second pinching portion to the first pinching portion with the embedded portion interposed therebetween by injection molding; and
- a painting step of painting the body and the coupling member after the body molding step and before the insertion step.

14. The method for manufacturing the slider for slide fastener according to claim 13, wherein in the body molding step, the body and the coupling member are formed by integrated injection molding.

15. A slider for slide fastener comprising:
a body including an upper blade, a lower blade, a guide post that connects the upper blade and the lower blade, and a pull tab attachment post erected on an upper surface of the upper blade; and a pull tab coupled to the pull tab attachment post, wherein the pull tab includes:
- a coupling member including an exposed portion having a shaft portion rotatably coupled to the pull tab attachment post, and an embedded portion; and
- a pinching member including a first pinching portion including an annular end portion having an opening through which the embedded portion is to be inserted, and a second pinching portion provided to the first pinching portion with the embedded portion interposed therebetween, wherein at least one of a front end surface and a rear end surface of the pull tab attachment post has a protrusion, wherein when the pull tab is tilted toward at least one of a front side and a rear side of the body, the protrusion locks the pull tab to restrict rotation of the pull tab, and wherein when the pull tab is tilted toward at least one of the front side and the rear side of the body, the protrusion and the pinching member are brought into contact with each other and the pinching member is elastically deformed, so that the protrusion locks the pull tab.

\* \* \* \* \*